(12) United States Patent
Kronestedt et al.

(10) Patent No.: US 6,298,095 B1
(45) Date of Patent: Oct. 2, 2001

(54) COMMUNICATING SIGNALING INFORMATION IN A CELLULAR SYSTEM THAT HAS A TIGHT FREQUENCY REUSE PATTERN

(75) Inventors: Fredric Kronestedt; Per Beming, both of Stockholm; Henrik Dam, Sundbyberg, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/054,533

(22) Filed: Apr. 3, 1998

(51) Int. Cl.[7] .................................................. H04L 27/04
(52) U.S. Cl. ..................... 375/295; 375/296; 370/318; 370/321; 370/442
(58) Field of Search ................................. 375/138, 295, 375/296, 299; 370/317, 318, 321, 330, 347, 442; 455/10, 13.4, 63

(56) References Cited

U.S. PATENT DOCUMENTS

| | | | |
|---|---|---|---|
| 5,333,175 | * 7/1994 | Ariyavisitakul et al. | 455/423 |
| 5,423,078 | 6/1995 | Epperson et al. | 455/89 |
| 5,633,742 | 5/1997 | Shipley | 359/137 |
| 5,663,957 | 9/1997 | Dent | 370/347 |
| 5,765,216 | * 6/1998 | Weng et al. | 711/214 |
| 5,822,310 | * 10/1998 | Chennakeshu et al. | 370/317 |
| 5,838,672 | * 11/1998 | Ranta | 370/335 |
| 5,930,248 | * 7/1999 | Langlet et al. | 370/347 |
| 5,930,706 | * 6/1998 | Raith | 455/422 |
| 6,006,075 | * 12/1999 | Smith et al. | 455/101 |

FOREIGN PATENT DOCUMENTS

WO 95/33313    12/1995   (WO) ........................................... 7/5

* cited by examiner

Primary Examiner—Stephen Chin
Assistant Examiner—Chieh M. Fan
(74) Attorney, Agent, or Firm—Burns, Doane, Swecker & Mathis, L.L.P.

(57) ABSTRACT

In a cellular communication system that has a tight reuse pattern, a method for transmitting bursts containing interleaved and non-interleaved data bits over RF channels assigned to a plurality of communication cells using two power levels. The bursts containing non-interleaved data bit, for example, frequency correction data bits and synchronization data bits, are transmitted using a first transmit power level, P1, and the bursts containing interleaved data bits, for example traffic data bits, are transmitted using a second transmit power level, $P_2$, with the first transmit power level, $P_1$, being greater than the second transmit power level, $P_2$.

18 Claims, 3 Drawing Sheets

Fig. 2
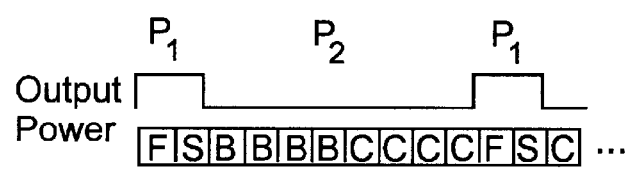
Fig. 3
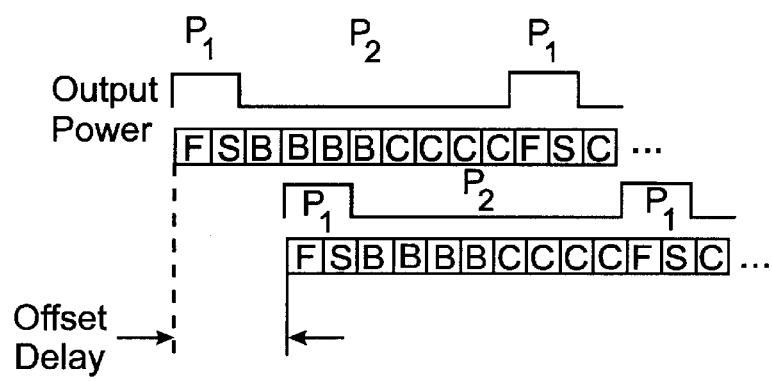
Fig. 4
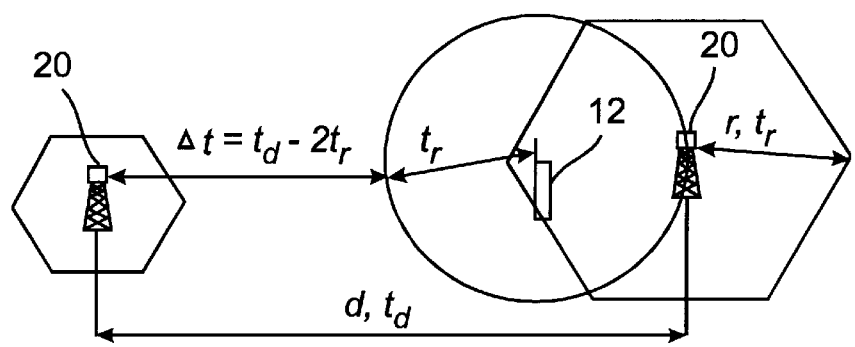
Fig. 5

COMMUNICATING SIGNALING INFORMATION IN A CELLULAR SYSTEM THAT HAS A TIGHT FREQUENCY REUSE PATTERN

TECHNICAL FIELD

The present invention generally relates to the field of communication systems; more particularly, to cellular systems that utilize a tight frequency reuse pattern.

BACKGROUND

Cellular communication systems that communicate voice, data and signaling messages are being rapidly employed around the globe. For example, European Telecommunication Standard Institute (ETSI) has specified a Global Standard for Mobile Communication (GSM) that uses time division multiple access (TDMA) to communicate different types of information over radio frequency (RF) channels. In the U.S., Telecommunication Industry Association (TIA) has published a number of Interim Standards, such as IS-136, that define various versions of digital advanced mobile phone service (D-AMPS), with the capability of transmitting voice and data to subscribers.

Generally, these types of communication systems cover a geographical area that is subdivided into communication cells, which together provide communication coverage to a service area, for example, an entire city. Each cell is served by one [or more] base station that communicate with mobile stations over downlink and uplink RF channels. The RF channels are subdivided into a number of time slots or logical channels during which data bits having various burst formats are communicated. GSM specification defines these formats as: normal burst (NB), access burst (AB), frequency correction bursts (FB), synchronization burst (SB), and dummy burst. Using the NB format, speech or text data bits are communicated during channels designated as traffic channels (TCH). Signaling data bits pertaining to call management within the system are communicated over control channels using one of the NB, SB or FB formats. Except for the dummy burst and FB, the remaining burst formats incorporate training sequences that are used by an equalizer to adjust the transmitted data bits at a receiving station.

In a GSM system, the control channels are grouped as broadcast channels (BCH), common control channels (CCCH), dedicated control channels, and a cell broadcast channel. The BCH are used for frequency correction, synchronization, and communicating cell specific information. As such, the BCH includes frequency correction channel (FCCH), synchronization channel (SCH), and broadcast control channel (BCCH). Data bits communicated over a FCCH burst, which uses the FB format, represent a sinus wave signal that serves to identify a RF channels carrying the BCH and CCCH and to enable the mobile stations to synchronize to these RF signal. Data bits communicated over a SCH burst, which uses the SB format, synchronize the mobile stations with the TDMA frame structure of a particular cell. Using a Base Station Identity Code (BSIC), the SCH data bits also identify a chosen cell as a GSM cell during a handover process. The CCCH are used for access and allocation of control channels. The CCCH include paging channel (FCH), access grant channel (AGCH), and random access channel (RACH). Among other things, the CCCH are used for paging a called mobile station, assigning a control channel, or initiating a call by a mobile station. According to the GSM specification, data bits communicated with the FB and SB formats are non-interleaved and are mapped on a single time-slot, i.e., time-slot 0, of a RF channel carrying the control channels used for call set-up procedure of a RF signal carrying the BCH and CCCH on a single burst. On the other hand, data bits communicated with the NB format, for example, the CCCH and TCH bursts, are interleaved and are mapped on several bursts.

Generally, the RF channels allocated to communication cells are patterned according to a reuse pattern that allows some of the spaced apart cells to use the same uplink and downlink RF channels. In this way, the reuse pattern of the system reduces the number of RF channels needed to cover the service area. It is, however, desirable to plan the cells using a tighter reuse pattern. The tighter reuse pattern is of particular importance, when communicating within a limited spectrum of, for example, 5–6 MHZ. Because the RF channels carrying the BCH and CCCH are a large portion of the total available spectrum, a tighter control channel reuse pattern would increase traffic capacity by allowing more RF channels to be allocated as the TCHs. A tighter control channel reuse pattern, however, may results in increased co-channel interference in other cells, thereby degrading system performance.

One conventional approach to improve the co-channel interference resistance teaches an antenna hopping technique. One such antenna hoping technique is disclosed, for example, in Håkan Olofsson et al., "Transmitter Diversity with Antenna Hopping for Wireless Communication Systems", in Proceeding of the IEEE VTC'97, in which different antennas are used for transmitting different bursts. In case a burst transmitted by one antenna is not received correctly, for example, due to severe fading, correct bursts transmitted by other antennas are used by interleaving and coding schemes to limit the bit error. With this antenna hopping technique, however, the transmitted data bits must be interleaved. Therefore, this technique is not suitable for communicating non-interleaved data bits, such as those communicated over the FCCH or SCH burst.

Another technique, known as delayed transmitter diversity, transmits the same burst via two or more uncorrelated paths, for example, from two spatially separated antennas. Under this technique, the bursts transmitted over one path are delayed (or have a small frequency offset) relative to the bursts transmitted over another path. Provided that a receiver equalizer can handle the delay (or offset), the transmitted bursts are demodulated based on the training sequences embedded on the bursts, thereby providing a diversity gain. However, the FCCH burst does not contain a training sequence. Consequently, this technique would not improve the FCCH performance, since it could not be equalized, due to its constant frequency structure.

Therefore, there is a need for improving performance, particularly control channel performance, in systems that employ a tight channel reuse pattern.

SUMMARY

Briefly, the present invention is embodied in a method for transmitting bursts containing interleaved and non-interleaved data bits over RF channels assigned to a plurality of communication cells. The bursts containing non-interleaved data bits are transmitted using a first transmit power level, $P_1$, and the bursts containing interleaved data bits are transmitted using a second transmit power level, $P_2$. The first transmit power level, $P_1$, is different from and preferably greater than the second transmit power level, $P_2$. In one application of the present invention, a downlink transmission method transmits bursts containing data bits on control channels assigned to a number of communication cells using two power levels, the first power level, $P_1$, and the second power level, $P_2$. In an exemplary embodiment, the non-interleaved data bits represent frequency correction data bits, such as FCCH data bits. Alternatively, the non-interleaved data bits may represent synchronization data bits, such as SCH data bits.

According to another aspect of the invention, the present invention transmits bursts that do not contain a training sequence, for example, frequency correction bursts, and bursts that do contain a training sequence, for example, traffic or signaling bursts. According to this aspect, the bursts that do not contain the training sequence are transmitted using the first transmit power level, $P_1$, and the bursts that contain the training sequence are transmitted using the second transmit power level, $P_2$, with the first transmit power level, $P_1$, being greater than the second transmit power level, $P_2$.

According to some of the more detailed features of the present invention, the bursts transmitted in one communication cell are synchronized with those transmitted in another communication. Under this arrangement, the transmission time of the bursts containing non-interleaved data bits or bursts that do not contain the training sequence in one cell may be offset from those of another cell by a predefined delay and are transmitted using the first transmit power level, $P_1$. Moreover, the bursts containing interleaved data bits, which may include signaling bursts and traffic bursts, are transmitted using the second transmit power level, $P_2$.

The increased power level during the transmission of burst containing non-interleaved data bits may increase the level of the RSSI measurements at some of the mobile stations during idle mode cell selection or neighboring-cell RSSI evaluation procedures. This increased RSSI measurement may cause a slight imbalance between the TCHs and the control channels, which may result in early handover with a small loss of desired carrier signal. Thus to prevent the loss of desired carrier signal, the traffic bursts on the traffic channels (TCH) may be transmitted using a third power level, $P_3$, that is different from the first power level, $P_1$, and the second power level, $P_2$, where the following relationship exists between the first, second, and third power levels: $P_1 > P_3 > P_2$.

According to yet another detailed feature of the present invention, the interleaved data bits may be transmitted from a plurality of antennas, whereas the non-interleaved data bits may be transmitted from a single antenna.

Brief Description of Drawings

FIG. 2 is a diagram of the multiplexing of the control channels used for call set-up procedures used in the communication system of FIG. 1.

FIG. 3 is a diagram depicting the power levels used for communicating bursts according to the present invention.

FIG. 4 is a diagram depicting the transmission time offset used for communicating bursts according to one of the features the present invention.

FIG. 5 is a diagram depicting the relationship between cell sizes in determining transmission time offset.

Detailed Description

Figure 1:
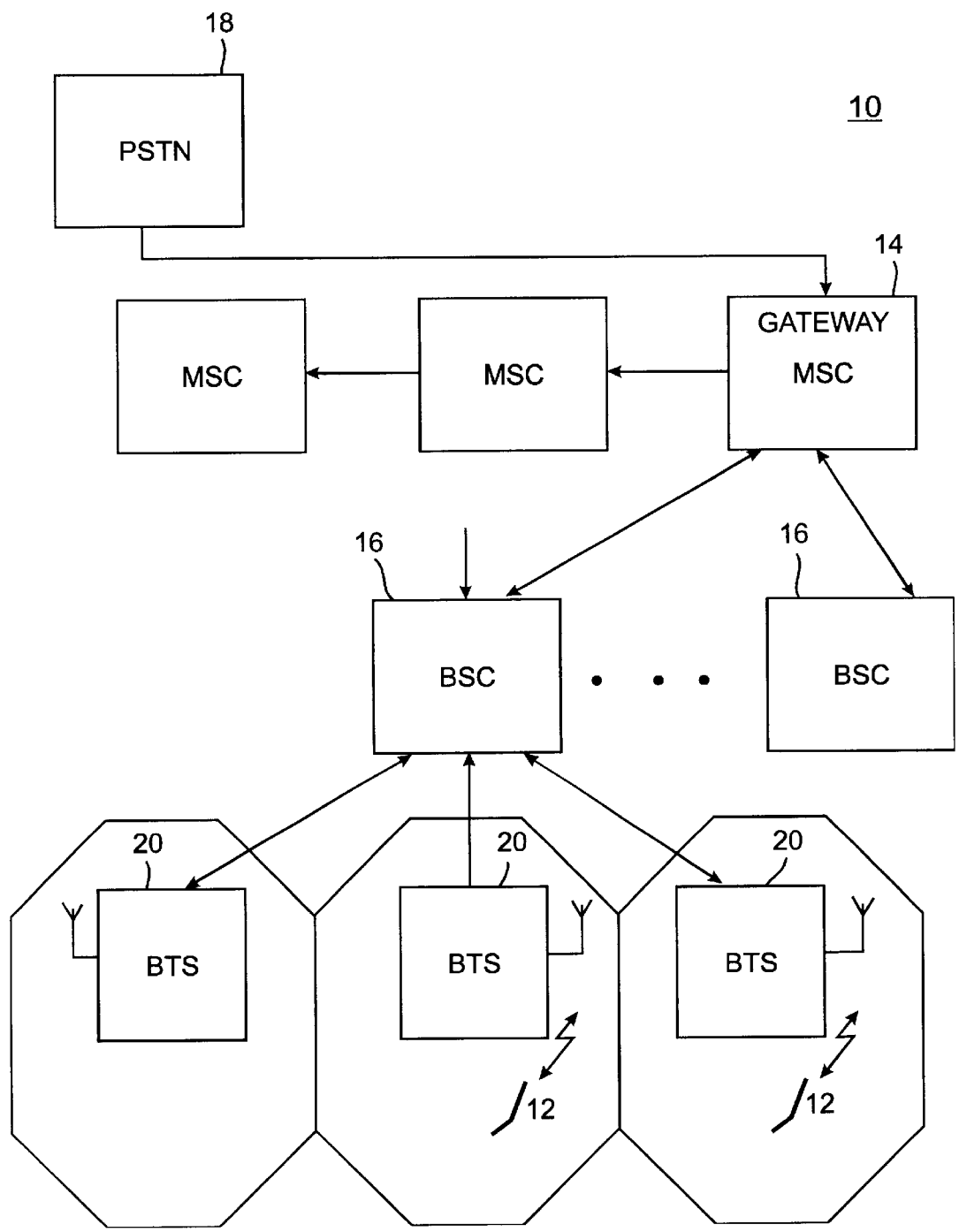
FIG. 1 is a block diagram of a communication system that advantageously incorporates the present invention.

Referring to FIG. 1, a block diagram of a communication system 10 that advantageously incorporates the present invention is shown. In an exemplary embodiment, it is assumed that the communication system 10 is a GSM communication system, offering service to a group mobile stations 12. The mode of operation of GSM communication systems is described in European Telecommunication Standard Institute (ETSI) documents ETS 300 573, ETS 300 574 and ETS 300 578, which are hereby incorporated by reference. Therefore, the operation of the GSM system is described to the extent necessary for understanding of the present invention. Although, the present invention is described as embodied in a GSM system, those skilled in the art would appreciate that the present invention could be used in a wide variety of other digital communication systems, such as those based on PDC or D-AMPS standards, and enhancements thereof. The present invention may also be used in a hybrid of CDMA and TDMA communication systems.

The system 10 is designed as a hierarchical network with multiple levels for managing calls and communicating voice and data messages with the mobile stations 12 using an allocated set of uplink and downlink RF channels. At a higher hierarchical level, a group of Mobile Service Switching Centers (MSCs) 14 are responsible for routing the calls from an originator to a destination. In particular, they are responsible for setup, control and termination of the calls as well as communicating voice and data messages with a Public Switched Telephone Network (PSTN) 18, or other public and private networks. At a lower hierarchical level, each one of the MSCs 14 are connected to a group of base station controllers (BSCs) 16. The primary function of a BSC 16 is radio resource management. For example, based on reported received signal strength from the mobile stations 12, the BSC 16 determines whether to initiate a handover. At a still lower hierarchical level each one of the BSCs 16 control a group of base transceiver stations (BTSs) 20. Each BTS 20 includes one or more transceivers (TRXs) that use the uplink and downlink RF channels to serve a particular common geographical area. In this way, the BTSs 20 primarily provide the RF links for the transmission and reception of data bursts to and from the mobile stations 12 within their designated cell.

For communicating the bursts, an RF channel (uplink or downlink) is divided into repetitive time frames. Each frame, which may be a superframe or a hyper-frame, is further divided into logical channels with speech or data messages being communicated over TCH bursts and signaling bursts. Referring to FIG. 2, a diagram of a multi-frame of a downlink RF channel carrying control channels used for cell set-up procedure is shown. As shown, the burst of this multi-frame is the FCCH burst (F) followed by the SCH burst (S), BCCH bursts (B) and CCCH bursts (C). The last burst in the multi-frame is an idle burst (I).

As explained before, the GSM specification, defines various formats for TCH and signaling bursts. The TCH bursts and some signaling bursts, such those used for the PCHs, AGCH, DCCH and BCCH, are transmitted using the NB format. The RACH bursts are communicated using the AB format. The FCCH bursts, which contain a number of fixed data bits that represent a sinus wave signal with a predefined frequency offset relative to the nominal RF channel, are transmitted using the FB format. The SCH bursts are transmitted using the SB format.

Most burst transmissions include training sequences that are patterned with predefined auto-correlation characteristics. During equalization, the auto-correlation characteristic of a training sequence helps in the adjustment of received data bits. To compensate for propagation delays, the communication system 10 uses a time alignment (TA) process by which the mobile units 12 align their burst transmissions to arrive at the BTSs 20 in proper time relationship relative to other bursts transmissions.

Except for data bits communicated over the FCCH and SCH bursts, the other data bits are interleaved over several bursts. As discussed, conventional antenna hopping techniques are not effective in improving co-channel interference resistance for non-interleaved data bits. According to one aspect of the present invention, the non-interleaved data bits are, therefore, transmitted using a first power level, $P_1$, and the interleaved data bits are transmitted using a second power level, $P_2$, which is less than the first power level, $P_1$. Also, according to another aspect of the invention, different power levels are used for transmitting the bursts that do not contain a training sequence, for example, frequency correction bursts, and bursts that do contain a training sequence, for example, traffic or signaling bursts. According to this aspect, the bursts that do not contains the training sequence are transmitted using the first transmit power level, $P_1$, and the burst that contain the training sequence are transmitted using the second transmit power level, $P_2$.

As depicted in FIG. 3, the bursts transmitted during logical channels designated as F and S use a higher power level, $P_1$, than those designated as the B and C channels. The first power level, $P_1$, is dependent on a target frequency reuse factor. Preferably, for reuse factors of 9–7 the first power level, $P_1$, is approximately 2–4 dB greater than the second power level, $P_2$, so that any loss due to a tight frequency reuse pattern is compensated.

In synchronized systems, yet another aspect of the present invention improves co-channel interference resistance by offsetting the transmission time of the bursts in cells that have the same allocated RF channels. According to this aspect, the transmission time of the bursts are adjusted such that the FCCH and SCH burst transmissions from these cells do not overlap with each other, as shown in FIG. 4. The amount of transmission time offset may be determined, among other things, based on the following parameters:

Distance between channel cells, $d \sim t_d$;

Time advancing, TA;

Radius of cell assigned the same RF channel, containing co-sequence interference, $r \sim t_r$. As shown by FIG. 5, the propagation times, $t_d$ and $t_r$ correspond to the distances d and r divided by the propagation speed c. For example, $t_d$ is derived from $t_d = d/c$. Therefore, transmission timing of individual BTSs 20 may be offset in time, based on cell radius, and distance between co-channel cells, by a predefined delay. Accordingly, the present invention offsets the transmission time of the bursts in the multi-frame by the predefined delay.

Figure 6:
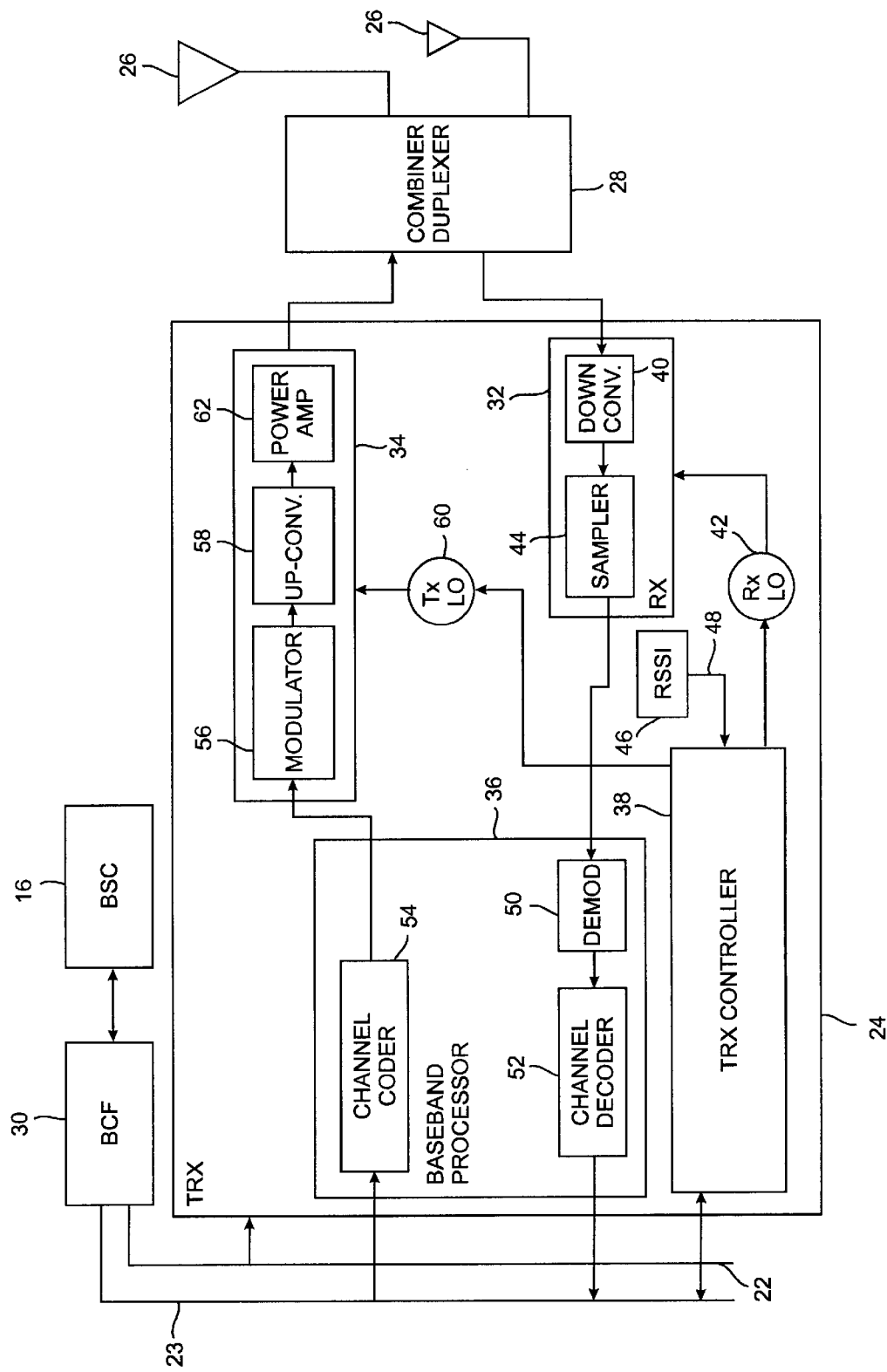
FIG. 6 is a block diagram of a base station used in the communication system of FIG. 1.

Referring to FIG. 6, an exemplary block diagram of a BTS 20 that operates according to the present invention is shown. Through a timing bus 22, the BTS 20 in one cell is synchronized with those in neighboring cells. Voice and data information are provided to and from the BTS 20 through a traffic bus 23 that may be coupled to a public or private voice and data transmission line, such as a T1 line (not shown). The BTS 20 includes a TRX 24 that communicate with the mobile stations 12 over the RF channels through one or more antennas 26. The TRX 24 is coupled to the antennas 26 through a combiner/duplexer 28 that combines transmission signals and distributes received signals in a well known manner. The BTS 20 also includes a base station common function (BCF) block 30 that controls the operation and maintenance of the BTS 20.

The TRX 24 includes a receiver section 32, a transmitter section 34, a baseband processor 36, and a TRX controller 38. The receiver section 32 receives uplink signals from the mobile stations 12 through the antennas 26. A down-conversion block 40 down-converts the received signal using a receiver local oscillator means (RxLO) 42. After down-converting the received signals the receiver section 32 samples its phase and magnitude, via a sampler block 44, to provide received data bits to the baseband processor 36. The baseband processor 36 includes a demodulator 50 that receives uplink baseband data from the receiver section 32. The uplink baseband data is applied to a channel decoder 52 that decodes the baseband signal according to one or more supported channel decoding schemes. The channel decoder 52 places the decoded baseband signal on the traffic bus 23, for further processing by the BSC 16.

When transmitting downlink baseband data, the baseband processor 36 receives properly coded data, speech and signaling information from the BSC 16 over the traffic bus 23 and applies them to a channel coder 54 that codes and interleaves speech and data as well as some signaling information. The transmitter section 34 includes a modulator 56 that modulates the supplied data bits according to a predefined scheme. The modulator 56 provides downlink baseband signals to an up-conversion block 58 for up-conversion. The up conversion block 58 is coupled to a transmitter local oscillator (TxLO) 60, which under the control of the TRX controller 38, tunes the transmitter section 34 to transmit signals over various RF channels. A power amplifier 62 amplifies the up-converted signal for radiation through one or more of the antennas 26.

In accordance with the invention, the transmission timing of the bursts and the output power level of the power amplifier 62 are controlled by the TRX controller 38. In synchronized systems, the TRX controller 38 is made aware of the transmission timing of the base stations of other cells via the timing bus 22. As explained above, the TRX controller 38 offsets or delays, the transmission time of the bursts relative to other base stations in order to reduce co-channel interference in neighboring cells. As described above, for non-interleaved data bits, the output power level of the power amplifier 62 is set to the first power level $P_1$ during the FCCH and SCH bursts. For interleaved data bits communicated over the BCCH, CCH, the TRX controller 38 sets the output power level to the second power level, $P_2$, which is different from the first power level. Similarly, the power level is controlled such that during the transmission of bursts that do not contain a training sequence, the first power level, $P_1$, is used., and during the transmission of the bursts that contain the training sequence, the second power level, $P_2$, is used.

It may be appreciated that the increased power level during the transmission of burst containing non-interleaved data bits may increase the level of the RSSI measurements at some of the mobile stations 12 during idle mode cell selection or neighboring-cell RSSI evaluation procedures. This increased RSSI measurement may cause a slight imbalance between the TCHs and the control channels, which may result in early handover with a small loss of desired carrier signal (<1.5 dB). If this loss is considered critical, the maximal allowed power on the TCH, may be set to a third power $P_3$ level that is slightly higher than the second power level, $P_2$, but less than the first power level $P_1$. Therefore, the power levels are set according to the following relationship: $P_1 > P_3 > P_2$. Therefore, the TRX controller 38 may set the output power level to the third power level, $P_3$, during the transmission of TCH bursts.

Finally, although FCCH and SCH burst transmissions do not benefit from the antenna hopping technique, the remaining bursts may benefit from the use of such technique. Therefore, a cyclic antenna hopping technique may be employed to transmit interleaved data bits of the BCCH and CCCH bursts from multiple antennas, while transmitting the non-interleaved data bits of FCCH and SCH bursts from a single antenna. Therefore, the present invention may be combined with conventional antenna hopping technique or delayed transmitter diversity to further enhance system performance.

From the foregoing description, it will be appreciated that the present invention makes it possible to use a tighter reuse pattern, thereby increasing traffic capacity of the system. Furthermore, the present invention improves synchronization performance which leads to improved handover performance in micro cells or other small cell systems, which may suffer from handover problems.

What is claimed is:

1. A method for transmitting bursts containing interleaved and non-interleaved data bits in a plurality of communication cells on both control channels and traffic channels, comprising the steps of:

transmitting bursts that contain non-interleaved data bits on said control channels using a first transmit power level, $P_1$;

transmitting bursts that contain interleaved data bits on said control channels using a second transmit power level, $P_2$, that is different from the first transmit power level, $P_1$; and transmitting bursts on the traffic channels using a third power level, $P_3$, that is different from the first power lever, $P_1$, and the second power level, $P_2$.

2. The method of claim 1, wherein the first transmit power level, $P_1$, is greater than the second transmit power level, $P_2$.

3. The method of claim 1, wherein the non-interleaved data bits represent frequency correction data bits.

4. The method of claim 1, wherein the non-interleaved data bits represent synchronization data bits.

5. The method of claim 1, wherein the bursts transmitted in one communication cell are synchronized with those transmitted in another communication cell.

6. The method of claim 5, wherein the transmission time of a burst containing non-interleaved data bits in one cell is offset from that of another cell by a predefined delay.

7. The method of claim 1, wherein the following relationship exists between the first, second, and third power levels: $P_1>P_3>P_2$.

8. The method of claim 1, wherein the interleaved data bits are transmitted from a plurality of antennas.

9. The method of claim 1, wherein the non-interleaved data bits are transmitted from a single antenna.

10. A method for transmitting bursts in a plurality of communication cells, wherein at least one of the bursts contains a training sequence and at least one of the bursts does not contain a training sequence, the method comprising the steps of:

transmitting only the burst that does not contains the training sequence using a first transmit power level, $P_1$;

transmitting burst that contains the training sequence and are not on traffic channels using a second transmit power level, $P_2$, that is different from the first transmit power level, $P_1$; and transmitting remaining bursts using a third power level, $P_3$, that is different from the first power level, $P_1$, and the second power level, $P_2$.

11. The method of claim 10, wherein the first transmit power level, $P_1$, is greater than the second transmit power level, $P_2$.

12. The method of claim 10, wherein the burst that does not contain the training sequence represents a frequency correction burst.

13. The method of claim 10, wherein the burst that contains the training sequence represents a traffic or a signaling burst.

14. The method of claim 10, wherein the bursts transmitted in one communication cell are synchronized with those transmitted in another communication cell.

15. The method of claim 14, wherein the burst that does not contain the training sequence in one cell is offset from that of another cell by a predefined delay.

16. The method of claim 10, wherein the following relationship exists between the first, second, and third power levels: $P_1>P_3>P_2$.

17. The method of claim 10, wherein the burst that contains the training sequence is transmitted from a plurality of antennas.

18. The method of claim 10, wherein the burst that does not contain the training sequence is transmitted from a single antenna.

* * * * *